US012585458B2

(12) United States Patent
Takatsuna

(10) Patent No.: US 12,585,458 B2
(45) Date of Patent: Mar. 24, 2026

(54) SERVER, SOFTWARE UPDATE SYSTEM, DISTRIBUTION METHOD, AND NON-TRANSITORY STORAGE MEDIUM

(71) Applicant: TOYOTA JIDOSHA KABUSHIKI KAISHA, Toyota (JP)

(72) Inventor: Yusuke Takatsuna, Ama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/387,988

(22) Filed: Nov. 8, 2023

(65) Prior Publication Data

US 2024/0069906 A1 Feb. 29, 2024

Related U.S. Application Data

(63) Continuation of application No. 17/395,005, filed on Aug. 5, 2021, now Pat. No. 11,853,742.

(30) Foreign Application Priority Data

Oct. 6, 2020 (JP) .................................. 2020-169362

(51) Int. Cl.
*G06F 8/654* (2018.01)
*B60R 16/023* (2006.01)
(Continued)

(52) U.S. Cl.
CPC .......... *G06F 8/654* (2018.02); *B60R 16/0231* (2013.01); *B60R 16/0238* (2013.01); *H04L 67/12* (2013.01); *H04L 67/34* (2013.01)

(58) Field of Classification Search
CPC .......... H04W 4/40; H04W 4/50; H04L 67/12; H04L 67/34; G06F 8/654; G06F 8/65; B60R 16/0238; B60R 16/0231
See application file for complete search history.

(56) References Cited

U.S. PATENT DOCUMENTS 9,569,353 B2 2/2017 Miyake et al.
9,841,970 B2 12/2017 Vangelov
(Continued)

FOREIGN PATENT DOCUMENTS

JP 2004-326689 A 11/2004
JP 2018-116349 A 7/2018
(Continued)

OTHER PUBLICATIONS

Kim et al. "ECU software updating scenario using OTA technology through mobile communication network." 2018 IEEE 3rd International Conference on Communication and Information Systems (ICCIS). IEEE, 2018. Retrieved from the Internet :<https://ieeexplore. ieee.org/stamp/stamp.jsp?tp=&arnumber=86> (Year: 2018).*
(Continued)

*Primary Examiner* — S. Sough
*Assistant Examiner* — Cheneca Smith
(74) *Attorney, Agent, or Firm* — Oliff PLC

(57) ABSTRACT

A server is configured to distribute update data for software for an electronic control unit mounted on a vehicle. The server includes: a storage device that stores device identification information in which information that specifies a communication module mounted on the vehicle and information that specifies a portable terminal configured to communicate with an update control device mounted on the vehicle are associated with each other, and the update data; and a processor configured to determine whether communication with the update control device is possible, and transmit the update data to the portable terminal that is associated with the communication module when the determination unit determines that the communication with the update control device is not possible.

2 Claims, 9 Drawing Sheets

(51) Int. Cl.
　　*H04L 67/00*　　　(2022.01)
　　*H04L 67/12*　　　(2022.01)

(56)　　　　　References Cited

U.S. PATENT DOCUMENTS

| | | | |
|---|---|---|---|
| 2009/0293068 A1* | 11/2009 | Yagiu | G06F 21/6245 |
| | | | 719/318 |
| 2012/0164944 A1 | 6/2012 | Yamaoka et al. | |
| 2013/0031540 A1* | 1/2013 | Throop | G06F 8/654 |
| | | | 717/173 |
| 2013/0139149 A1 | 5/2013 | Boulais et al. | |
| 2016/0210131 A1 | 7/2016 | Vangelov et al. | |
| 2017/0262277 A1 | 9/2017 | Endo et al. | |
| 2017/0302774 A1* | 10/2017 | Lei | H04W 48/16 |
| 2020/0233654 A1 | 7/2020 | Matsumoto et al. | |

FOREIGN PATENT DOCUMENTS

| | | | |
|---|---|---|---|
| JP | 2018-181377 A | 11/2018 |
| JP | 2019-20866 A | 2/2019 |
| KR | 10-2015-0144623 A | 12/2015 |

OTHER PUBLICATIONS

Wu, Zhi, et al. "Security design of OTA upgrade for intelligent connected vehicle." proceedings of the 2021 1st international conference on control and intelligent robotics. 2021. Retrieved from the Internet: <https://dl.acm.org/doi/pdf/10.1145/3473714.3473851> (Year: 2021).*

Aug. 18, 2022 Office Action issued in U.S. Appl. No. 17/395,005.
Feb. 17, 2023 Office Action issued in U.S. Appl. No. 17/395,005.
Aug. 16, 2023 Notice of Allowance issued in U.S. Appl. No. 17/395,005.

* cited by examiner

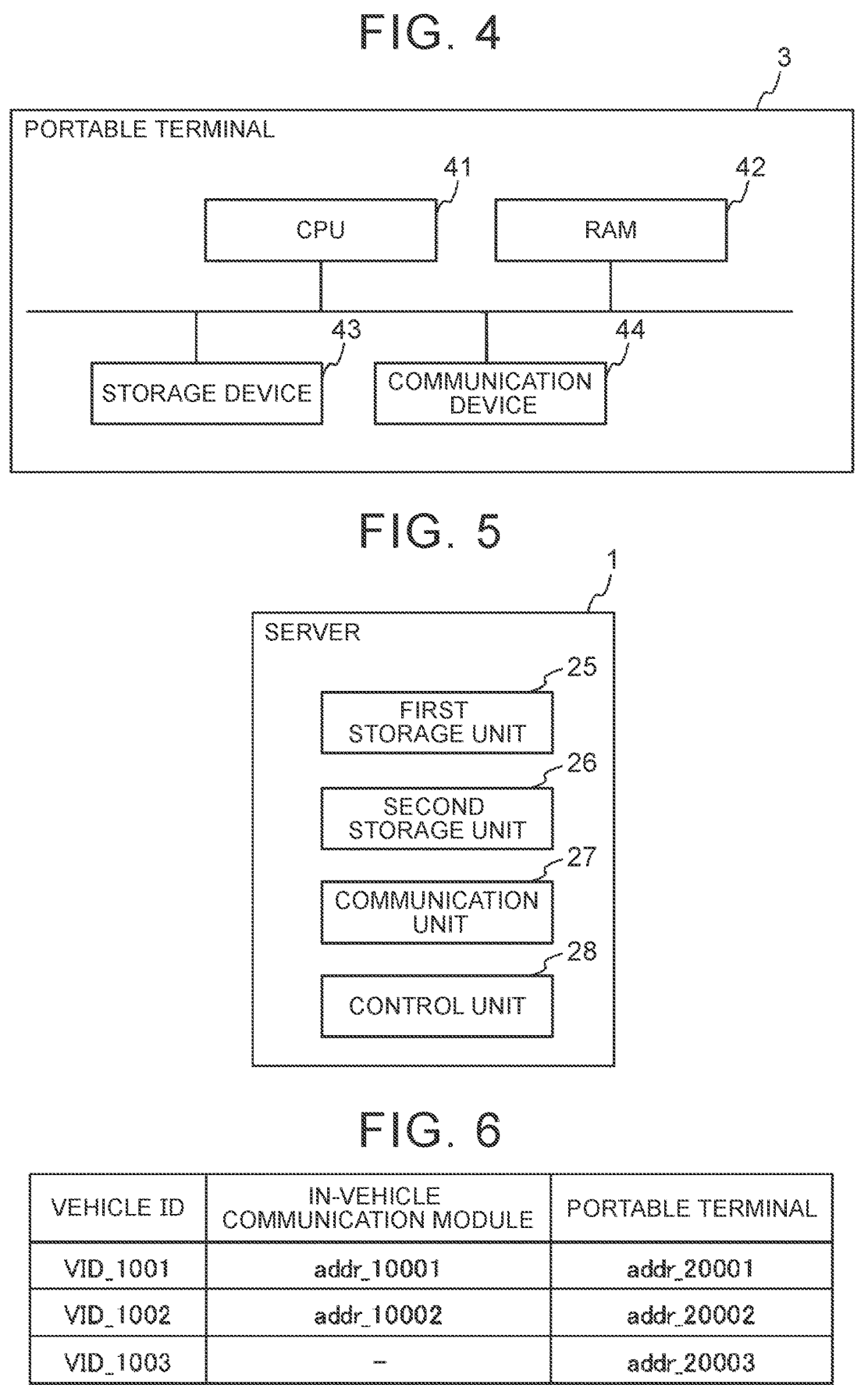

PORTABLE TERMINAL

| CPU | 41 |
| RAM | 42 |

| STORAGE DEVICE | 43 |
| COMMUNICATION DEVICE | 44 |

SERVER

FIRST STORAGE UNIT 25

SECOND STORAGE UNIT 26

COMMUNICATION UNIT 27

CONTROL UNIT 28

FIG. 6

| VEHICLE ID | IN-VEHICLE COMMUNICATION MODULE | PORTABLE TERMINAL |
|---|---|---|
| VID_1001 | addr_10001 | addr_20001 |
| VID_1002 | addr_10002 | addr_20002 |
| VID_1003 | – | addr_20003 |

FIG. 7
| VEHICLE ID | POSSIBILITY OF OTA | ECU1 | ECU2 | ECU3 | ECU4 | ... |
|---|---|---|---|---|---|---|
| VID_1001 | POSSIBLE | 2.0 | 2.0 | 1.4 | 1.0 | |
| VID_1002 | POSSIBLE | 1.0 | 1.0 | 1.0 | 1.0 | |
| VID_1003 | NOT POSSIBLE | 1.0 | 1.0 | 1.0 | 1.0 | |
FIG. 8
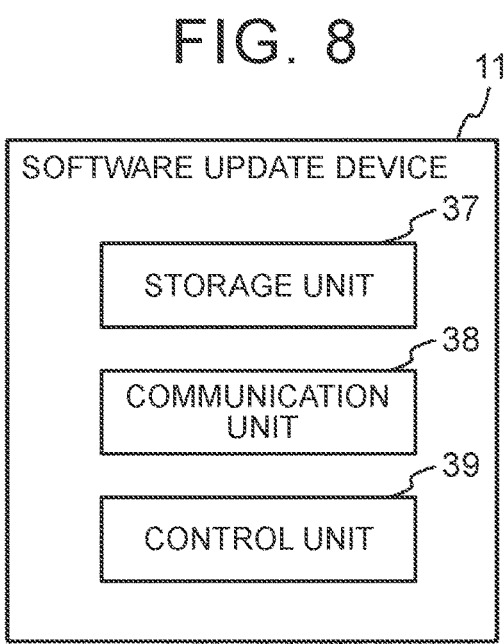
SOFTWARE UPDATE DEVICE — 11
STORAGE UNIT — 37
COMMUNICATION UNIT — 38
CONTROL UNIT — 39
FIG. 9
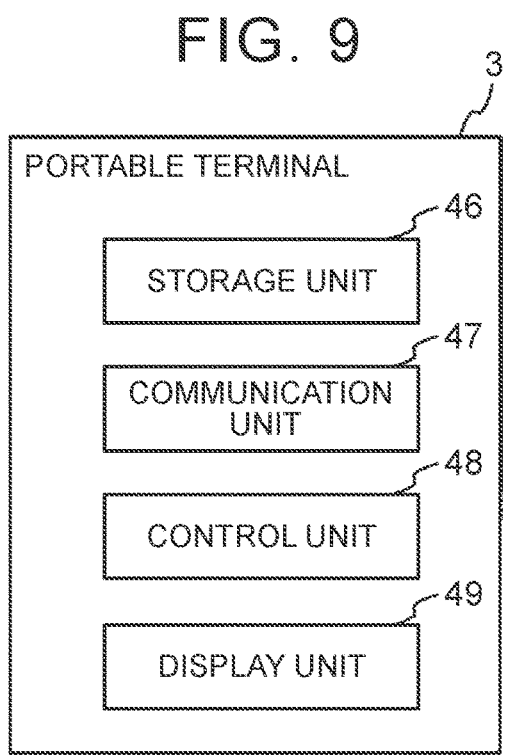
PORTABLE TERMINAL — 3
STORAGE UNIT — 46
COMMUNICATION UNIT — 47
CONTROL UNIT — 48
DISPLAY UNIT — 49

| VEHICLE ID | TERMINAL: HIGH PRIORITY | | TERMINAL: LOW PRIORITY | |
|---|---|---|---|---|
| VID_1001 | IN-VEHICLE COMMUNICATION MODULE | addr_10001 | PORTABLE TERMINAL | addr_20001 |
| VID_1002 | PORTABLE TERMINAL | addr_20002 | IN-VEHICLE COMMUNICATION MODULE | addr_10002 |
| VID_1003 | IN-VEHICLE COMMUNICATION MODULE | addr_10003 | – | – |
| VID_1004 | PORTABLE TERMINAL | addr_20004 | – | – |

SERVER, SOFTWARE UPDATE SYSTEM, DISTRIBUTION METHOD, AND NON-TRANSITORY STORAGE MEDIUM

CROSS-REFERENCE TO RELATED APPLICATION

This application is a continuation of U.S. application Ser. No. 17/395,005 filed Aug. 5, 2021, now U.S. Pat. No. 11,853,742 issued Dec. 26, 2023, which claims priority to Japanese Patent Application No. 2020-169362 filed on Oct. 6, 2020, incorporated herein by reference in its entirety.

BACKGROUND

1. Technical Field

The present disclosure relates to a server, a software update system, a distribution method, and a non-transitory storage medium.

2. Description of Related Art

A plurality of electronic control units (ECUs) for controlling operation of a vehicle is mounted on the vehicle. The ECUs each include a processor, a temporary storage unit such as a random access memory (RAM), and a non-volatile storage unit such as a flash read only memory (ROM). The processor executes software stored in the non-volatile storage unit to implement the control function of the ECU. The software stored in each ECU is rewritable. The function of each ECU can be improved and a new vehicle control function can be added by updating the software to a newer version.

An example of the related art for updating software for an ECU is an Over-the-Air (OTA) technology in which an in-vehicle communication device connected to an in-vehicle network and a communication network such as the Internet are wirelessly connected to each other, software is downloaded from a server via the wireless communication, and the downloaded software is installed to update or add a program for an ECU (see Japanese Unexamined Patent Application Publication No. 2018-181377 (JP 2018-181377 A), for example).

Update of the software through the OTA can be started when the ignition or the power of the vehicle is turned on, by an update control device mounted on the vehicle transmitting information on the version of a program for an in-vehicle device (update confirmation) to a server via a communication device mounted on the vehicle (see JP 2018-181377 A, for example). When update data are downloaded from the server, the update control device notifies a user of the presence of the update data by displaying an indication on a display device etc. in the vehicle, and installs and activates the update data upon receiving agreement from the user given by operating an input device such as a button.

SUMMARY

A case where a communication module mounted on the vehicle cannot communicate with the server because of a radio wave condition, a fault, etc. is assumed. It is also conceivable that a communication module for communication with the server itself is not mounted on the vehicle, depending on the model, usage, etc. of the vehicle. In such cases, the program for the electronic control unit cannot be updated through the OTA, and therefore there is room for improvement.

The present disclosure provides a server, a software update system, a distribution method, and a non-transitory storage medium that enable update of software for an electronic control unit even when communication between the server and a vehicle is not possible.

A server according to a first aspect of the present disclosure is configured to distribute update data for software for an electronic control unit mounted on a vehicle. The server includes: a storage device that stores device identification information in which information that specifies a communication module mounted on the vehicle and information that specifies a portable terminal configured to communicate with an update control device mounted on the vehicle are associated with each other, and the update data; and a processor configured to determine whether communication with the update control device is possible, transmit the update data to the update control device via the communication module when the update control device requests transmission of the update data via the communication module, and transmit the update data to the portable terminal that is associated with the communication module when the determination unit determines that the communication with the update control device is not possible.

A software update system for updating software for an electronic control unit mounted on a vehicle, according to a second aspect of the present disclosure includes: a server configured to distribute update data for the software for the electronic control unit; and a portable terminal configured to communicate with the update control device and the server, wherein the server includes a storage device that stores device identification information in which information that specifies a communication module mounted on the vehicle and information that specifies the portable terminal are associated with each other, and the update data, and a processor configured to determine whether communication with the update control device is possible, transmit the update data to the update control device via the communication module when the update control device requests transmission of the update data via the communication module, and transmit the update data to the portable terminal that is associated with the communication module when the determination unit determines that the communication with the update control device is not possible.

A distribution method by which a computer including a processor, a memory, and a storage device distributes update data for software for an electronic control unit mounted on a vehicle, according to a third aspect of the present disclosure storing device identification information in which information that specifies a communication module mounted on the vehicle and information that specifies a portable terminal configured to communicate with an update control device mounted on the vehicle are associated with each other; storing the update data; determining whether the computer is able to communicate with the update control device; transmitting the update data to the update control device via the communication module when the update control device requests transmission of the update data via the communication module; and transmitting the update data to the portable terminal that is associated with the update control device when the computer determines that communication with the update control device is not possible.

A non-transitory storage medium according to a fourth aspect of the present disclosure a distribution program that is executable by a computer including a processor, a memory, and the non-transitory storage medium and that causes the computer to execute the distribution method according to the third aspect.

With the present disclosure, it is possible to provide a server, a software update system, a distribution method, and a non-transitory storage medium that enable update of software for an electronic control unit even when communication between the server and a vehicle is not possible.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a block diagram illustrating a schematic configuration of a portable terminal illustrated in FIG. 1;

FIG. 5 is a functional block diagram of a server according to a first embodiment;

FIG. 6 illustrates an example of device identification information stored in the server;

FIG. 7 illustrates an example of update management information stored in the server;

FIG. 8 is a functional block diagram of a software update device according to the first embodiment;

FIG. 9 is a functional block diagram of a portable terminal according to the first embodiment;

DETAILED DESCRIPTION OF EMBODIMENTS

Configuration Common to First and Second Embodiments

Figure 1:
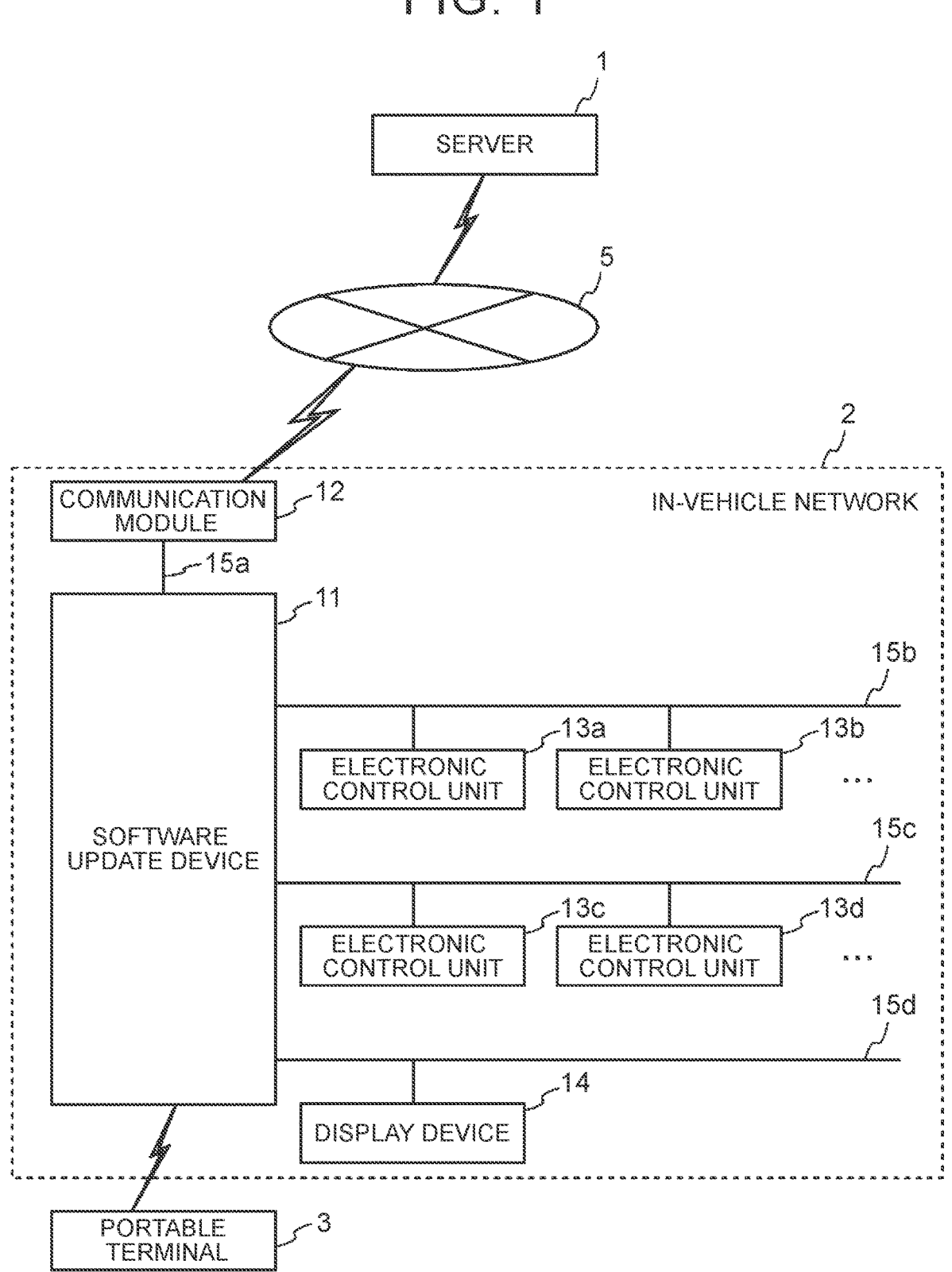
FIG. 1 is a block diagram illustrating the overall configuration of a network system according to an embodiment.
Figure 2:
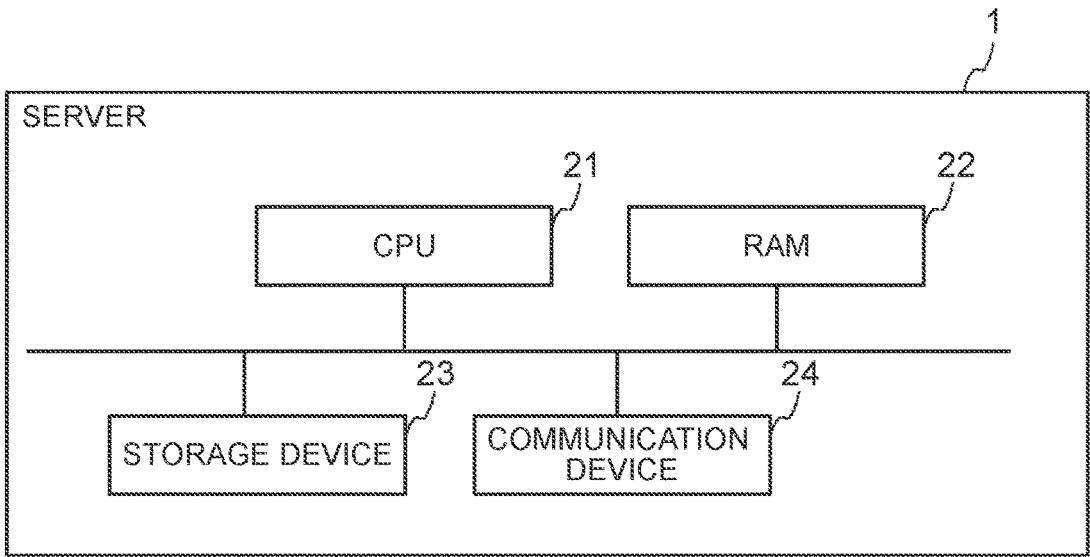
FIG. 2 is a block diagram illustrating a schematic configuration of a server illustrated in FIG. 1.
Figure 3:
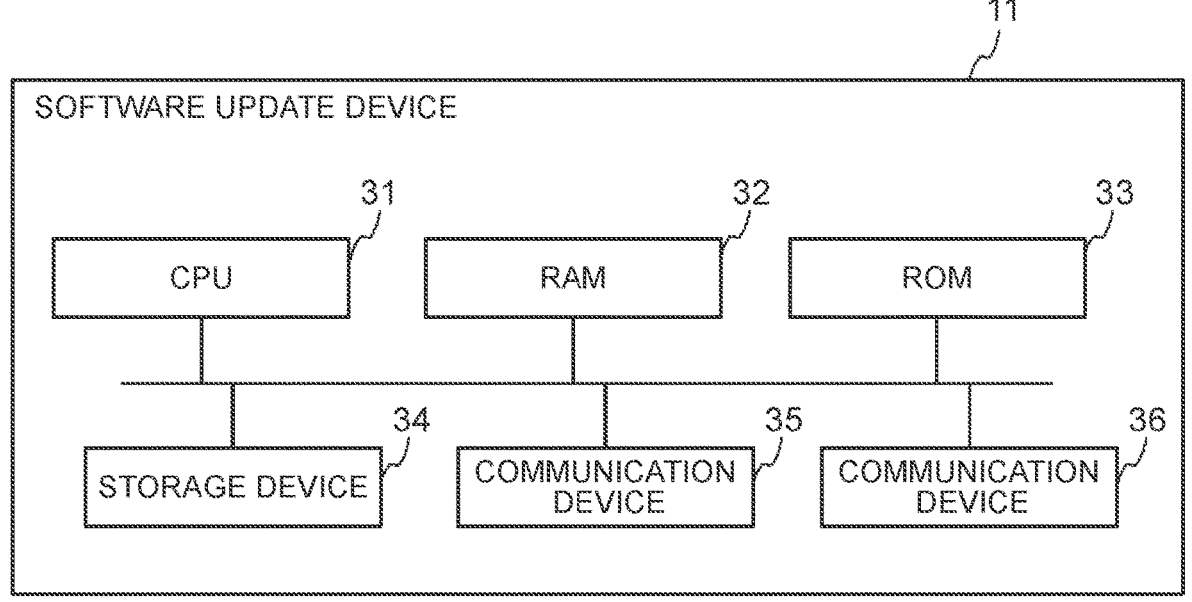
FIG. 3 is a block diagram illustrating a schematic configuration of a software update device illustrated in FIG. 1.

FIG. 1 is a block diagram illustrating the overall configuration of a network system according to an embodiment. FIG. 2 is a block diagram illustrating a schematic configuration of a server illustrated in FIG. 1. FIG. 3 is a block diagram illustrating a schematic configuration of a software update device illustrated in FIG. 1. FIG. 4 is a block diagram illustrating a schematic configuration of a portable terminal illustrated in FIG. 1.

A network system illustrated in FIG. 1 is a system for updating software for electronic control units 13a to 13d mounted on a vehicle, and includes a server 1 (center) and an in-vehicle network 2 mounted on the vehicle.

The server 1 can communicate with a software update device 11 mounted on the vehicle via a network 5, and manages update of software for the electronic control units 13a to 13d that are mounted on the vehicle.

As illustrated in FIG. 2, the server 1 includes a central processing unit (CPU) 21, a random access memory (RAM) 22, a storage device 23, and a communication device 24. The storage device 23 includes a rewritable storage medium such as a hard disk or a solid state drive (SSD), and stores a program for executing management of update of software, information to be used for update management, and update data for the electronic control units. In the server 1, the CPU 21 executes a control process, to be discussed later, by executing a program read from the storage device 23 using the RAM 22 as a work area. The communication device 24 is a device that communicates with the software update device 11 via a network.

The in-vehicle network 2 includes the software update device 11 (OTA master), a communication module 12, the electronic control units 13a to 13d, and a display device 14. The software update device 11 is connected to the communication module 12 via a bus 15a, connected to the electronic control units 13a, 13b via a bus 15b, connected to the electronic control units 13c, 13d via a bus 15c, and connected to the display device 14 via a bus 15d. The software update device 11 can wirelessly communicate with the server 1 via the communication module 12. The software update device 11 can also wirelessly communicate with a portable terminal 3 such as a smartphone or an electronic key. The software update device 11 controls update of software for an update-target electronic control unit (target ECU) for which software is a target of update, among the electronic control units 13a to 13d, based on update data distributed from the server 1. The software update device 11 is occasionally referred to as a central gateway. The communication module 12 is a communication device that connects between the in-vehicle network 2 and the server 1. The electronic control units 13a to 13d control operation of various portions of the vehicle. The display device 14 (human-machine interface abbreviated as HMI) is used to display various indications, such as an indication that there are update data, an agreement request screen for requesting a user or a manager for agreement to software update, and an update result, during a process of updating software for the electronic control units 13a to 13d. While the display device 14 may typically be a display device of a car navigation system, the display device 14 is not specifically limited as long as the display device 14 can display information that is necessary for a program update process. While four electronic control units 13a to 13d are illustrated in FIG. 1, the number of electronic control units is not specifically limited. Further, an electronic control unit may be connected to the bus 15d illustrated in FIG. 1 in addition to the display device 14.

The electronic control units 13a to 13d each include a CPU, a RAM, a non-volatile memory (storage), and a communication device. The CPU implements the function of the electronic control unit by executing software (program) read from the non-volatile memory using the RAM as a work area. Some electronic control units have one data storage area (bank) for storing software, while others have two data storage areas (banks) for storing software. The data storage areas of the electronic control units occasionally store version information, parameter data, a boot program for start-up, a program for software update, etc., in addition to the software for implementing the function of the electronic control unit. In the electronic control units having one data storage area, software for the electronic control units is affected when update data are installed in the data storage area. In the electronic control units having two data storage areas, on the other hand, one of the two data storage areas is used as a storage area to be read (operation side), and software stored in the storage area to be read is executed. Update data can be written into the other storage area that is not to be read (non-operation side) in the background during execution of a program in the storage area to be read (operation side). During activation in a software update process, the storage area from which the CPU reads a program can be switched to activate an updated version of software.

In the present disclosure, the electronic control units having two data storage areas include: an electronic control unit including a memory of a configuration called "single bank suspend memory" in which a data storage area (single bank) of a non-volatile memory is virtually partitioned into two banks so that a program can be written into one bank while executing a program on the other bank; and an electronic control unit including a non-volatile memory having a data storage area (single bank) and an enhanced non-volatile memory having a data storage area (single bank) so that the two non-volatile memories can be used as an operation side and a non-operation side.

As illustrated in FIG. 3, the software update device 11 includes a CPU 31, a RAM 32, a ROM 33, a storage device 34, and communication devices 35, 36. In the software update device 11, the CPU 31 executes a control device, to be discussed later, by executing the program read from the ROM 33 or the storage device 34 using the RAM 32 as a work area. The communication device 35 is a device that communicates with the communication module 12, the electronic control units 13a to 13d, and the display device 14 via the buses 15a to 15d illustrated in FIG. 1. Meanwhile, the communication device 36 is a device that wirelessly communicates with the portable terminal 3, and can communicate by a communication method such as Bluetooth (registered trademark) Low Energy (BLE), Wi-Fi (registered trademark), or radio frequency (RF)/low frequency (LF) communication, for example.

The software update process includes a phase of downloading update data, a phase of transferring the downloaded update data to an update-target electronic control unit and installing the update data in a storage area of the update-target electronic control unit, and a phase of activating the updated version of software installed in the update-target electronic control unit.

Downloading is a process of receiving from the server 1 and storing update data for updating software for the electronic control unit. The downloading phase includes not only receiving the update data, but also controlling a sequence of processes related to the downloading, such as determining whether the downloading can be executed and verifying the update data. Installation is a process of writing an updated version of the program (update software) in a storage unit of an in-vehicle device in the update-target electronic control unit, based on the downloaded update data. The installation phase includes not only executing the installation, but also controlling a sequence of processes related to the installation, such as determining whether the installation can be executed, transferring the update data, and verifying an updated version of the program. Activation is a process of activating the installed updated version of the program. The activation control includes not only executing the activation, but also controlling a sequence of processes related to the activation, such as determining whether the activation can be executed and verifying the execution result.

The update data may include any of update software for the electronic control unit, compressed data prepared by compressing the update software, and divided data prepared by dividing the update software or the compressed data. The update data may also include an identifier (ECU ID) that identifies the update-target electronic control unit, and an identifier (ECU software ID) that identifies the software before being updated. The update data are downloaded as the distribution package discussed above. The distribution package includes update data for a single or a plurality of electronic control units.

When the update data include the update software itself, the software update device transfers the update data (update software) to the update-target electronic control unit in the installation phase. When the update data include the compressed data, differential data, or divided data of the update software, the software update device 11 may transfer the update data to the update-target electronic control unit so that the update-target electronic control unit generates the update software from the update data, or the software update device 11 may generate the update software from the update data and transfer the update software to the update-target electronic control unit. The update software can be generated by decompressing the compressed data or assembling the differential data or the divided data.

The installation of the update software can be performed by the update-target electronic control unit based on an installation request from the software update device 11. Alternatively, the update-target electronic control unit that has received the update data may autonomously perform the installation without receiving an explicit instruction from the software update device 11.

The activation of the update software can be performed by the update-target electronic control unit based on an activation request from the software update device 11. Alternatively, the update-target electronic control unit that has received the update data may autonomously perform the activation without receiving an explicit instruction from the software update device 11.

The software update process can be performed for the plurality of electronic control units continuously or concurrently.

The term "software update process" as used herein includes not only a process in which all of the downloading, the installation, and the activation are performed continuously, but also a process in which only some of the downloading, the installation, and the activation are performed.

As illustrated in FIG. 4, the portable terminal 3 includes a CPU 41, a RAM 42, a storage device (storage) 43 such as a non-volatile memory, and a communication device 44. The CPU 41 implements a variety of functions by executing the software (program) read from the storage device 43 using the RAM 42 as a work area. In the present embodiment, the portable terminal 3 is a terminal device that can communicate with the server 1 and the software update device 11, and may be a portable device (wireless key) to be used as a key to the vehicle, a smartphone, etc., for example. The method of communication between the portable terminal 3 and the electronic control unit is not specifically limited, and may be Bluetooth (registered trademark) Low Energy (BLE), Wi-Fi (registered trademark), or RF/LF communication, for example.

First Embodiment

FIG. 5 is a functional block diagram of a server according to a first embodiment. FIG. 6 illustrates an example of device identification information stored in the server. FIG. 7 illustrates an example of update management information stored in the server.

The server 1 includes a first storage unit 25, a second storage unit 26, a communication unit 27, and a control unit 28. The first storage unit 25 and the second storage unit 26 are implemented by the storage device 23 illustrated in FIG. 2. The communication unit 27 and the control unit 28 are implemented by the CPU 21 illustrated in FIG. 2 executing a program (control program for the software update device 11) stored in the storage device 23 using the RAM 22.

The first storage unit 25 stores device identification information and update management information.

As illustrated in FIG. 6, the device identification information is information in which information that specifies the communication module 12 that is mounted on the vehicle and information that specifies the portable terminal 3 that can communicate with the software update device 11 are associated with each other for each piece of vehicle identification information (vehicle ID) that identifies a vehicle. The information that specifies the communication module 12 and the information that specifies the portable terminal 3 may be information that allows the server 1 to uniquely designate the destination for transmission of data, for example, and may be an address on a network such as an Internet Protocol (IP) address, for example. The device identification information is used to acquire a second destination for transmission of the update data for software for the electronic control units when the server 1 cannot transmit the update data through communication with the vehicle via the communication module 12. In the example in FIG. 6, the respective addresses of the communication module 12 and the portable terminal are registered for vehicles specified by vehicle IDs "VID_1001" and "VID_1002", and the address of the portable terminal is registered for a vehicle specified by a vehicle ID "VID_1003".

As illustrated in FIG. 7, the update management information is information in which information that indicates whether software can be updated through wireless communication (that is, indicates possibility of the OTA) and information that indicates software that can be used by one or more electronic control units mounted on the vehicle are associated with each piece of vehicle identification information (vehicle ID) that identifies a vehicle. Information on a combination of the latest versions of software for a plurality of electronic control units is defined as the information that indicates software that can be used by the electronic control units, for example. As indicated in FIG. 6, no communication module that can communicate with the server 1 is mounted on a vehicle specified by the vehicle ID "VID_1003", and therefore "not possible" is set as the information that indicates the possibility of the OTA for the vehicle.

The second storage unit 26 stores update data for the electronic control units. As discussed above, the update data may include any of update software for the electronic control unit, compressed data prepared by compressing the update software, and divided data prepared by dividing the update software or the compressed data.

The communication unit 27 can receive an update confirmation request for software from the software update device 11. The update confirmation request is information that is transmitted from the software update device 11 to the server 1 when the power or the ignition of the vehicle is turned on, and that requests the server 1 to confirm whether there are update data for the electronic control units, for example. The communication unit 27 transmits information that indicates the presence or absence of such update data to the software update device 11 in response to the update confirmation request received from the software update device 11. The communication unit 27 can also receive a distribution package transmission request (download request) from the software update device 11. When a distribution package download request is received, the communication unit 27 transmits a distribution package including update data for software for the electronic control units to the software update device 11 that made the download request. When communication between the server 1 and the software update device 11 cannot be made, the communication unit 27 transmits a notification indicating that there are update data for the electronic control units to the portable terminal 3 that is associated with the software update device 11 in the device identification information. In this case, when a download request is received from the portable terminal 3, the communication unit 27 transmits a distribution package including update data for software for the electronic control units to the portable terminal 3 that made the download request.

When the communication unit 27 receives the update confirmation request, the control unit 28 determines, based on the update management information stored in the first storage unit 25, whether there are update data for software for the vehicle specified by the vehicle ID included in the update confirmation request. The result of the determination by the control unit 28 as to whether there are update data is transmitted to the software update device 11 by the communication unit 27. When it is determined that there are update data for the electronic control units, the control unit 28 generates a distribution package including the update data stored in the second storage unit 26 when the distribution package download request is received from the software update device 11. The distribution package is transmitted to the software update device 11 by the communication unit 27.

The control unit 28 also determines whether communication between the server 1 and the software update device 11 is possible. The control unit 28 determines that communication between the server 1 and the software update device 11 (vehicle) is not possible when communication between the server 1 and the software update device is disrupted or when an in-vehicle device that is necessary for software update is not mounted on the vehicle that includes the software update device 11. The control unit 28 can determine, based on a communication log of the communication unit 27, that communication between the server 1 and the software update device 11 is not possible when communication (communication through the OTA or other communication) between the server 1 and the software update device 11 is not performed in a predetermined period. Alternatively, the control unit 28 may determine communication between the server 1 and the software update device 11 is not possible when the difference between the version of software for each electronic control unit recorded in the update management information and the latest version of the software is a predetermined difference or more or when update of software for the electronic control unit is not recorded for a certain period in a history of update of software for the electronic control unit. Whether an in-vehicle device that is necessary for software update is mounted on the vehicle can be determined based on the device identification information indicated in FIG. 6 or the update management information indicated in FIG. 7. Examples of the in-vehicle device that is necessary for software update can include a device that includes a display device such as a car navigation system that is used for a process of requesting agreement from the user, besides the communication module 12 discussed above.

FIG. 8 is a functional block diagram of the software update device according to the first embodiment.

The software update device 11 includes a storage unit 37, a communication unit 38, and a control unit 39. The storage unit 37 is implemented by the storage device 34 illustrated in FIG. 3. The communication unit 38 and the control unit 39 are implemented by the CPU 31 illustrated in FIG. 3 executing a program (control program for the software update device 11) stored in the ROM 33 using the RAM 32.

The storage unit 37 stores update data for software downloaded from the server 1, besides a program for executing update of software for the electronic control units 13*a* to 13*d* and various data to be used to execute software update.

The communication unit 38 transmits an update confirmation request for software to the server 1 when the power or the ignition of the vehicle is turned on etc. The update confirmation request includes a vehicle ID for identifying the vehicle and the version of software for the electronic control units 13*a* to 13*d* connected to the in-vehicle network 2. The vehicle ID and the version of software for the electronic control units 13*a* to 13*d* are used to determine whether there are update data for software for the electronic control units through a comparison with the latest version of software that the server 1 holds for each vehicle ID. The control unit 39 receives a confirmation result that indicates the presence or absence of update data from the server 1 as a response to the update confirmation request, and determines the presence or absence of update data based on the confirmation result. When there are update data for software for any of the electronic control units, the control unit 39 transmits a distribution package download request to the server 1, and receives a distribution package transmitted from the server 1. The distribution package may include, besides the update data, verification data for verifying the authenticity of the update data, the number of pieces of the update data, the order of installation, various control information to be used during software update, etc. When the distribution package including the update data is received from the server 1, the control unit 39 verifies the authenticity of the received distribution package.

After the distribution package including the update data is downloaded, the control unit 39 performs an update data installation process, an activation process, and an agreement request process for the installation process or the activation process. When software update is executed, the control unit 39 performs, as the agreement request process, a process of causing an output device to output a notification indicating that agreement to software update is required and a notification that prompts making an input indicating agreement to software update and a process of receiving an operation input from the user. The output device may be the display device 14 that is provided in the in-vehicle network 2, a voice output device that makes a voice notification, etc. For example, in the agreement request process, when the display device 14 is used as the output device, the control unit 39 causes the display device 14 to display an agreement request screen for requesting agreement to software update, and causes the display device 14 to display a notification that prompts a specific input operation such as depressing an agreement button when the user or the manager agrees. In the agreement request process, the control unit 39 also causes the display device 14 to display language, an icon, etc. indicating that there are update data for software for the electronic control units, and causes the display device 14 to display restrictions imposed during execution of the software update process etc.

FIG. 9 is a functional block diagram of the portable terminal according to the first embodiment.

The portable terminal 3 includes a storage unit 46, a communication unit 47, a control unit 48, and a display unit 49. The storage unit 46 is implemented by the storage device 43 illustrated in FIG. 4. The communication unit 47 and the control unit 48 are implemented by the CPU 41 illustrated in FIG. 4 executing a program stored in the storage device 43 using the RAM 42.

The storage unit 46 stores update data for software downloaded from the server 1, besides a program for executing update of software for the electronic control units 13*a* to 13*d* and various data to be used to execute software update.

The communication unit 47 can wirelessly communicate with the server 1 and the software update device 11. The communication unit 47 receives, from the server 1, a notification indicating that there are update data for software for the electronic control units. This notification is transmitted from the server 1 when communication between the server 1 and the software update device 11 is not possible. When the notification indicating that there are update data for software for the electronic control units is received, the communication unit 47 can transmit a distribution package download request to the server 1, and receive a distribution package transmitted from the server 1. The communication unit 47 may transmit a distribution package download request to the server 1 based on an explicit instruction from the user, or may automatically transmit a distribution package download request in response to the above notification from the server 1. As discussed above, the distribution package may include, besides the update data, verification data for verifying the authenticity of the update data, the number of pieces of the update data, the order of installation, various control information to be used during software update, etc. When software for the electronic control units is updated through communication between the portable terminal 3 and the software update device 11, the communication unit 47 transfers update data downloaded from the server 1 to the software update device 11.

After the distribution package including the update data is downloaded, the control unit 48 performs a process of updating software for the electronic control units using the downloaded update data through wireless communication with the software update device 11. The software update process executed by the portable terminal 3 includes an update data installation process, an activation process, and an agreement request process for the installation or the activation. In the installation process, the control unit 48 instructs the software update device 11 to perform installation. In the activation process, the control unit 48 instructs the software update device 11 to activate the updated software. In addition, the control unit 48 performs, as the agreement request process, a process of causing the display unit 49 to output a notification indicating that agreement to software update is required and a notification that prompts making an input indicating agreement to software update so as to request agreement from the user, and a process of receiving agreement to software update from the user. The control unit 48 may cause a voice output device of the portable terminal 3 etc. to output a notification, in addition to the output of a notification by the display unit 49. For example, in the agreement request process, the control unit 48 causes the display unit 49 to display an agreement request screen for requesting agreement to software update, and causes the display unit 49 to display a notification that prompts a specific input operation such as depressing an agreement button when the user or the manager agrees. In the agreement request process, the control unit 48 also causes the display unit 49 to display language, an image, etc. indicating that there are update data for software for the electronic control units, and causes the display unit 49 to display restrictions imposed during execution of the software update process etc.

The display unit 49 has a display screen, and displays various display contents as the control unit 48 executes software (application).

Figure 10:
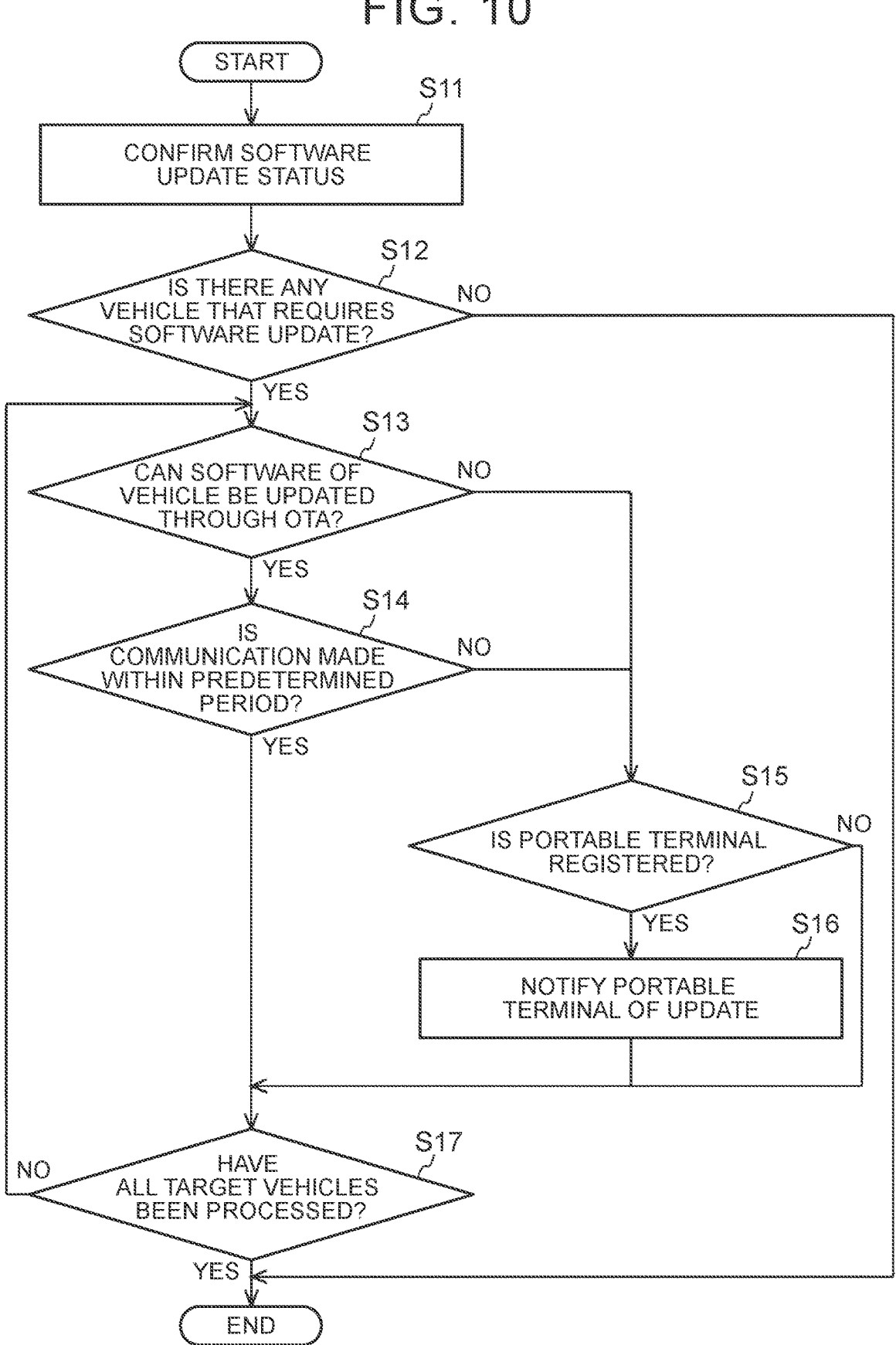
FIG. 10 is a flowchart illustrating an example of a control process executed by the server according to the first embodiment.

FIG. 10 is a flowchart illustrating an example of a control process executed by the server according to the first embodiment. More particularly, the drawing indicates an example of a process of determining whether communication between the server and the software update device is possible. The process in FIG. 10 can be executed regularly at intervals of a certain period, for example.

In step S11, the control unit 28 confirms the status of update of software in each vehicle. Specifically, the control unit 28 references the update management information (FIG. 7) stored in the first storage unit 25, and extracts a record of a vehicle that requires update of software for the electronic control units based on a comparison between the version of software for the electronic control units recorded in the update management information and the latest version of the software. For example, when the latest versions of software for ECU1, ECU2, ECU3, and ECU4 are 2.0, 2.0, 1.4, and 1.0, respectively, in the example in FIG. 7, the vehicle specified by the vehicle ID "VID_1001" holds the latest software and therefore does not require software update, but the vehicles specified by the vehicle IDs "VID_1002" and "VID_1003" require software update. In order to simplify description, it is assumed that the three vehicles indicated in FIG. 7 are of the same model and include the same electronic control units mounted thereon. The control unit 28 extracts the records of the vehicles specified by the vehicle IDs "VID_1002" and "VID_1003" as records of vehicles that require software update. In the following description, the vehicles that require software update extracted in step S11 will be referred to as "target vehicles". After that, the process proceeds to step S12.

In step S12, the control unit 28 determines whether there is any vehicle that requires software update. The control unit 28 determines YES when any record of a vehicle that requires software update is extracted in step S11. The process proceeds to step S13 when the result of the determination in step S12 is YES, and is ended otherwise.

In step S13, the control unit 28 determines whether the target vehicles specified in step S11 are vehicles, the software of which can be updated through wireless communication (OTA). More particularly, the control unit 28 selects one of the records of the target vehicles extracted in step S11. The control unit 28 determines whether the software can be updated through the OTA, based on information that indicates the possibility of the OTA included in the selected record. The process proceeds to step S14 when the result of the determination in step S13 is YES, and proceeds to step S15 otherwise.

In step S14, the control unit 28 determines whether communication is made between the server 1 and the vehicle (software update device 11) within a predetermined period. The determination in step S14 may be made based on the communication log of the communication unit 27. The process proceeds to step S17 when the result of the determination in step S14 is YES, and proceeds to step S15 otherwise.

In step S15, the control unit 28 determines whether a portable terminal is registered. More particularly, the control unit 28 references the device identification information (FIG. 6), and determines whether information on a portable terminal associated with the vehicle ID in the record selected in step S13 is registered. The process proceeds to step S16 when the result of the determination in step S15 is YES, and proceeds to step S17 otherwise.

In step S16, the communication unit 27 transmits a notification indicating that it is necessary to update the software for the electronic control units to the portable terminal associated with the vehicle ID in the record selected in step S13. After that, the process proceeds to step S17.

In step S17, the control unit 28 determines whether the records of all the target vehicles extracted in step S11 have been processed (whether the processes in steps S13 to S16 have been performed). The process is ended when the result of the determination in step S17 is YES, and proceeds to step S13 otherwise.

Figure 11:
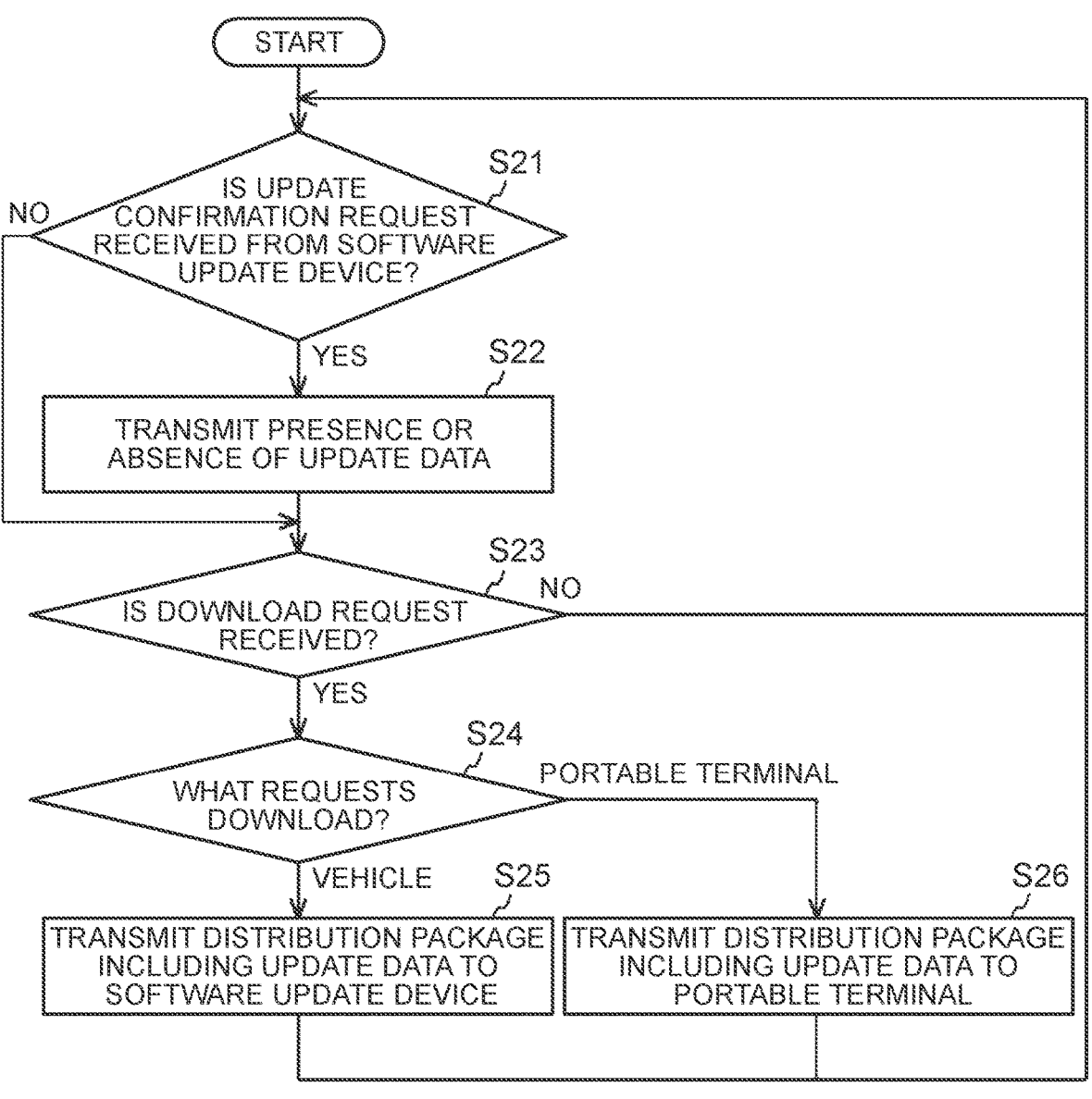
FIG. 11 is a flowchart illustrating an example of an update data distribution process executed by the server according to the first embodiment.

FIG. 11 is a flowchart illustrating an example of an update data distribution process executed by the server according to the first embodiment. The control process illustrated in FIG. 11 is executed repeatedly at predetermined time intervals, for example. The device identification information, the update management information, and the update data are registered in the storage units (the first storage unit 25 and the second storage unit 26) in advance before execution of the control process in FIG. 11.

In step S21, the communication unit 27 determines whether an update confirmation request is received from the software update device 11. The process proceeds to step S22 when the result of the determination in step S21 is YES, and proceeds to step S23 otherwise.

In step S22, the communication unit 27 transmits, to the vehicle that transmitted the update confirmation request, information that indicates whether there are update data for software for the electronic control units. Whether there are update data can be determined as follows, for example: the control unit 28 makes a comparison between a combination of the versions of software stored in the update management information in association with the vehicle ID included in the update confirmation request and a combination of the present versions of software included in the update confirmation request; and the control unit 28 determines that there are update data when the combination of the present versions of software included in the update confirmation request is older than the combination of the versions of software stored in the update management information. After that, the process proceeds to step S23.

In step S23, the communication unit 27 determines whether a download request for update data (distribution package) is received. The process proceeds to step S24 when the result of the determination in step S23 is YES, and proceeds to step S21 otherwise.

In step S24, the control unit 28 determines whether the download request received in step S23 is transmitted from a vehicle (software update device 11) or a portable terminal 3. The process proceeds to step S25 when the download request is transmitted from a vehicle, and proceeds to step S26 when the download request is transmitted from a portable terminal 3.

In step S25, the communication unit 27 transmits, to the software update device 11, a distribution package including update data for software and generated by the control unit 28. After that, the process proceeds to step S21.

In step S26, the communication unit 27 transmits, to the portable terminal 3, a distribution package including update data for software and generated by the control unit 28. After that, the process proceeds to step S21.

The process in step S25 indicated in FIG. 11 is an update data distribution process executed when communication between the server 1 and the software update device 11 is possible. The process in step S26 is an update data distribution process executed when communication between the server 1 and the software update device 11 is not possible.

Figure 12:
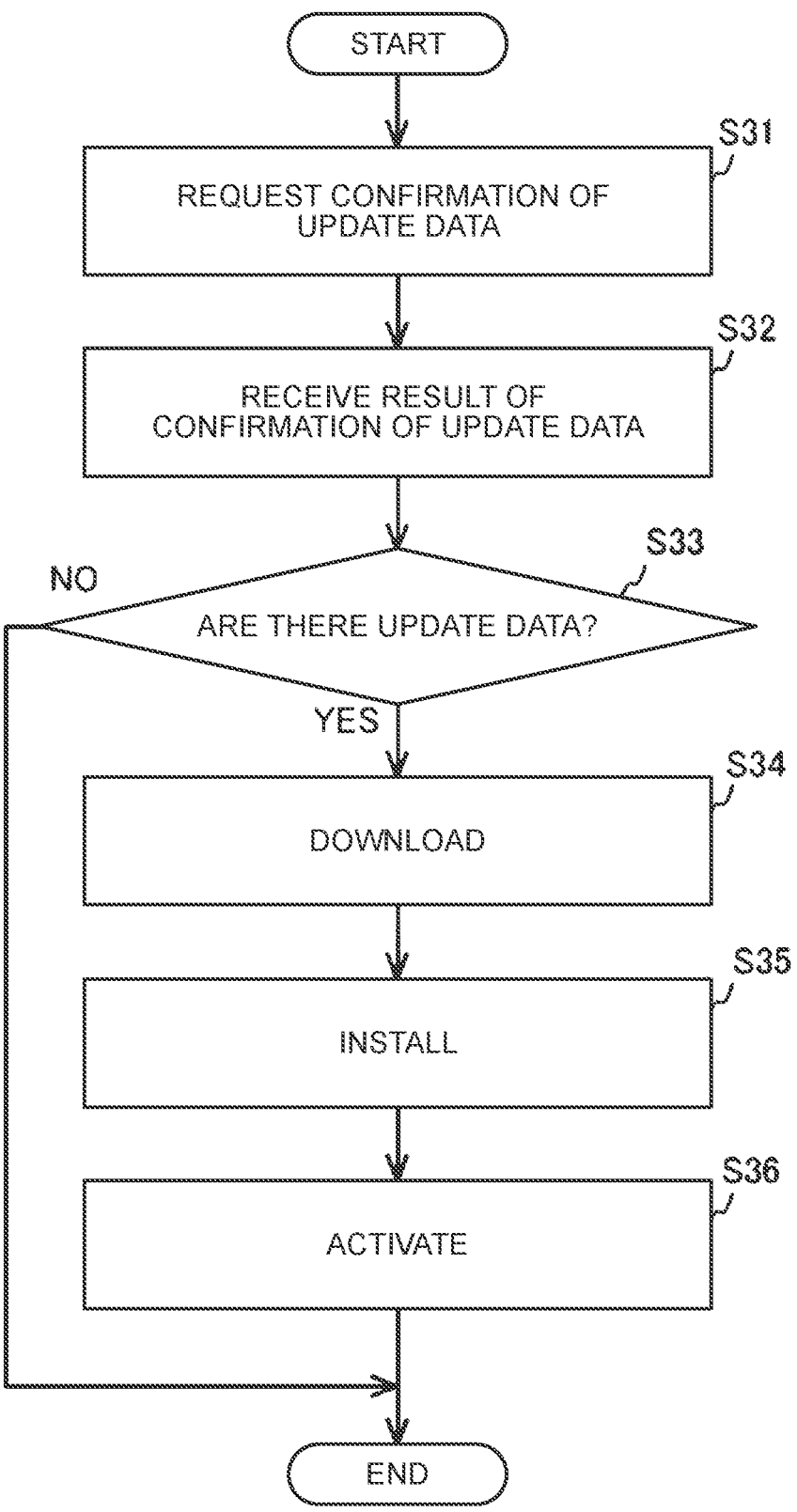
FIG. 12 is a flowchart illustrating an example of a software update process executed by the software update device.

FIG. 12 is a flowchart illustrating an example of a software update process executed by the software update device. The control process illustrated in FIG. 12 is a process in which the software update device 11 updates software for the electronic control units through communication with the server 1, and is executed when the power or the ignition of the vehicle is turned on, for example.

In step S31, the communication unit 38 transmits, to the server 1, an update confirmation request that includes a vehicle ID and a combination of the versions of software for the electronic control units 13*a* to 13*d*. After that, the process proceeds to step S32.

In step S32, the communication unit 38 receives the result of confirming update data from the server 1. After that, the process proceeds to step S33.

In step S33, the control unit 39 determines, based on the confirmation result received from the server 1, whether there are update data for software for the electronic control units 13*a* to 13*d*. The process proceeds to step S34 when the result of the determination in step S33 is YES, and is ended otherwise.

In step S34, the communication unit 38 executes a download process. More particularly, the communication unit 38 transmits a distribution package download request to the server 1, receives a distribution package transmitted in response to the download request, and stores the received distribution package in the storage unit 37. The communication unit 38 verifies the authenticity of update data included in the received distribution package. In step S34, it may be determined whether downloading can be executed, or the server 1 may be notified of the completion of the downloading. After that, the process proceeds to step S35.

In step S35, the control unit 39 executes an installation process for the update-target electronic control units. The installation process in step S35 includes determining whether installation can be executed, a process of requesting the user for agreement to installation and receiving an input for agreement, transfer of update data from the software update device 11 to the update-target electronic control units, requesting the update-target electronic control units for installation, requesting the update-target electronic control units to verify the installation, etc. The update-target electronic control units install an updated version of software in a storage area using the update data received from the software update device 11. After that, the process proceeds to step S36.

In step S36, the control unit 39 executes an activation process for the update-target electronic control units. The activation process in step S36 includes determining whether activation can be executed, a process of requesting the user for agreement to activation and receiving an input for agreement, requesting the update-target electronic control units for activation, etc. The update-target electronic control units activate and start an updated version of software by switching the software to be executed to the updated version of software. After that, the process is ended.

Figure 13:
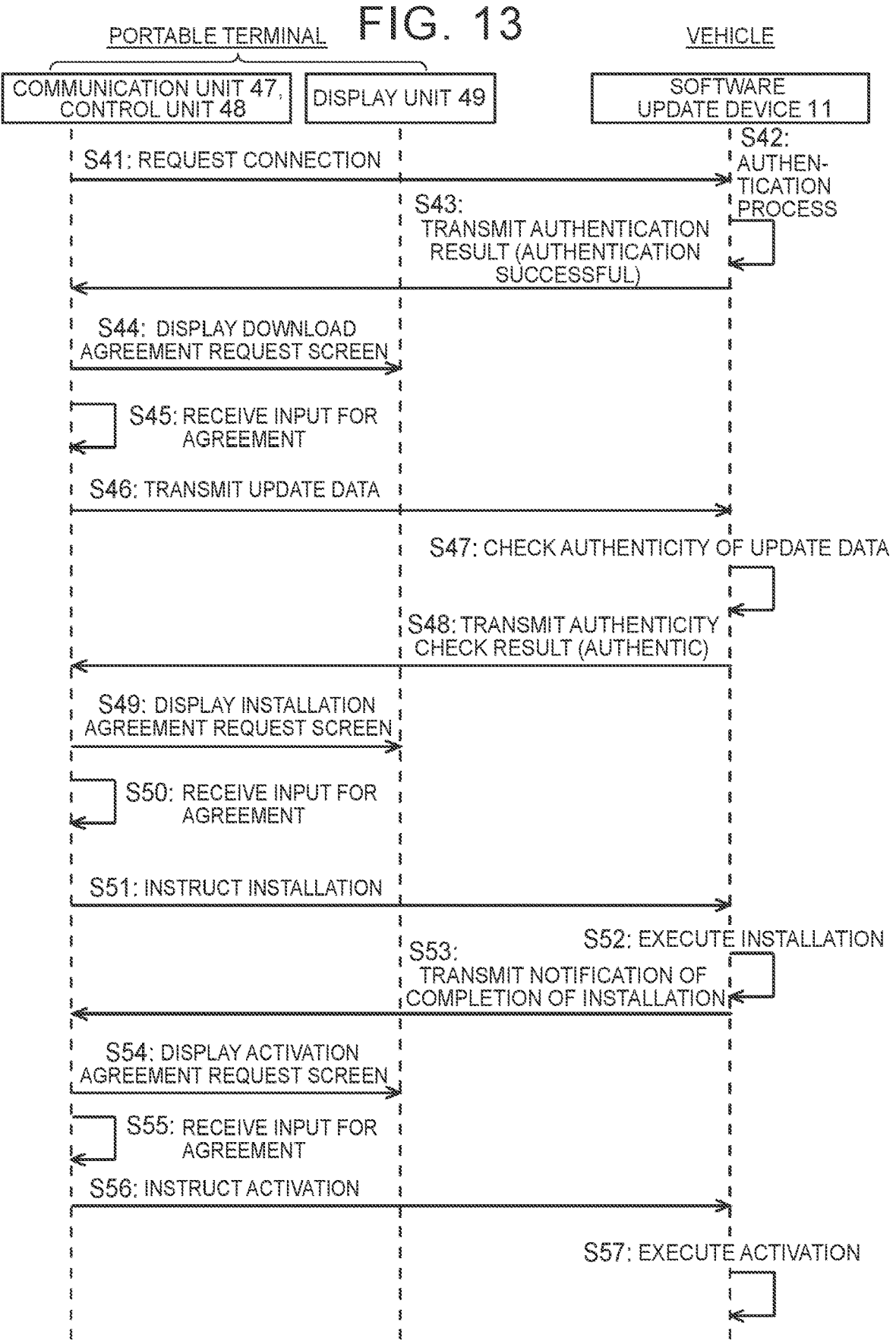
FIG. 13 is a sequence diagram illustrating another example of the software update process executed by the software update device.

FIG. 13 is a sequence diagram illustrating another example of the software update process executed by the software update device. The control process illustrated in FIG. 13 is a process in which the software update device 11 updates software for the electronic control units through communication with the portable terminal 3, and is executed when an instruction from the user is input to the portable terminal 3 or the software update device 11, for example.

In step S41, the communication unit 47 of the portable terminal 3 transmits a connection request to the software update device 11. The connection request in step S41 is transmitted when an instruction from the user is input, for example. After that, the process proceeds to step S42.

In step S42, the control unit 39 of the software update device 11 performs an authentication process to authenticate the portable terminal that transmitted the connection request. The method of the authentication process is not specifically limited, and a known authentication process can be adopted. In the authentication process, the software update device 11 may communicate with the portable terminal a plurality of times. The authentication process in step S42 may be performed by an electronic control unit that unlocks the vehicle or that performs authentication at the time of start-up, rather than by the software update device 11. In this case, software for the electronic control units is updated using the portable terminal 3 that is used as an electronic key to the vehicle, and therefore security can be improved. After that, the process proceeds to step S43.

In step S43, the communication unit 38 of the software update device 11 transmits the authentication result to the portable terminal 3. In the example in FIG. 13, the software update device 11 transmits an authentication result indicating that authentication has been successfully made in step S43. After that, the process proceeds to step S44.

In step S44, the control unit 48 of the portable terminal 3 causes the display unit 49 to display an agreement request screen for requesting agreement to downloading of update data. After that, the process proceeds to step S45.

In step S45, the control unit 48 of the portable terminal 3 receives an input indicating that the user has agreed to the downloading. When the control unit 48 detects that an input indicating agreement is made by operating a touch panel, a button, etc., the process proceeds to step S46.

In step S46, the communication unit 47 of the portable terminal 3 transfers the update data stored in the storage unit 46 to the software update device 11. After that, the process proceeds to step S47.

In step S47, the control unit 39 of the software update device 11 checks the authenticity of the update data received from the portable terminal 3. After that, the process proceeds to step S48.

In step S48, the communication unit 38 of the software update device 11 transmits the result of checking the authenticity of the update data to the portable terminal 3. In the example in FIG. 13, the software update device 11 transmits a check result indicating that the update data are authentic in step S47. After that, the process proceeds to step S49.

In step S49, the control unit 48 of the portable terminal 3 causes the display unit 49 to display an agreement request screen for requesting agreement to installation of update data. The control unit 48 causes the display unit 49 to display an indication indicating that update of software for the electronic control units is started, for example, and to display, as necessary, the time required for the installation and restrictions imposed and cautions to be taken during the installation. After that, the process proceeds to step S50.

In step S50, the control unit 48 of the portable terminal 3 receives an operation input made by the user using input means such as a touch panel or an operation button. The operation input indicating agreement to the installation can be determined based on whether a button such as "I agree" or "Start update" displayed on the display unit 49 is depressed, for example. When the user does not agree to start updating (install) the software immediately but desires to start updating (install) the software later, such desire can be received when a button such as "Update later" is depressed. When the control unit 48 detects that an input indicating agreement is made by operating a touch panel, a button, etc., the process proceeds to step S51.

In step S51, the communication unit 47 of the portable terminal transmits an instruction to install update data to the software update device 11. After that, the process proceeds to step S52.

In step S52, the control unit 39 of the software update device 11 executes an installation process for the update-target electronic control units. The installation process in step S52 includes determining whether installation can be executed, transfer of update data from the software update device 11 to the update-target electronic control units, requesting the update-target electronic control units for installation, requesting the update-target electronic control units to verify the installation, etc. The update-target electronic control units install an updated version of software in a storage area using the update data received from the software update device 11. After that, the process proceeds to step S53.

In step S53, the communication unit 38 of the software update device 11 transmits an installation completion notification that indicates the completion of the installation to the portable terminal 3. After that, the process proceeds to step S54.

In step S54, the control unit 48 of the portable terminal 3 causes the display unit 49 to display an agreement request screen for requesting agreement to activation of the updated version of software. The control unit 48 causes the display unit 49 to display an indication indicating that preparations for update of software for the electronic control units have been made and the program is to be updated by performing a specific operation such as turning off the power or the ignition, for example, and to display, as necessary, the time required for the activation and restrictions imposed and cautions to be taken during the activation. After that, the process proceeds to step S55.

In step S55, the control unit 48 of the portable terminal 3 receives an operation input made using input means such as a touch panel or an operation button to agree to the activation. The operation input indicating agreement to the activation can be determined based on whether a button such as "I agree" or "Update" displayed on the display unit 49 is depressed, for example. When the user does not agree to update (activate) the software immediately but desires to update (install) the software later, such desire can be received when a button such as "Update later" is depressed. When the control unit 48 detects that an input indicating agreement is made by operating a touch panel, a button, etc., the process proceeds to step S56.

In step S56, the communication unit 47 of the portable terminal transmits an instruction to activate the updated version of software to the software update device 11. After that, the process proceeds to step S57.

In step S57, the control unit 39 of the software update device 11 executes an activation process for the update-target electronic control units. The activation process in step S57 includes determining whether activation can be executed, a process of receiving an input for agreement, requesting the update-target electronic control units for activation, etc. The update-target electronic control units activate and start an updated version of software by switching the software to be executed to the updated version of software. After that, the process is ended.

When the update-target electronic control units are configured to have one data storage area, the software for the electronic control units is affected when update data are installed in the data storage area, and therefore the installation and the activation are preferably performed consecutively. In this case, when the update-target electronic control units are configured to have one data storage area, an agreement request process for the installation and the activation may be performed before execution of the installation, and an agreement request process to be performed before execution of the activation may be omitted.

As described above, the server 1 according to the present embodiment holds, as the device identification information, information (such as address) on the software update device 11 that is mounted on the vehicle and a portable terminal (a smartphone or a smart key) that can communicate with the software update device 11. When software cannot be updated through communication between the server 1 and the software update device 11, the server 1 can execute update of software for the electronic control units via the portable terminal 3 that can communicate with the software update device 11 of the target vehicle. Thus, software for the electronic control units can be updated at appropriate times even when the server 1 cannot communicate with the vehicle. In addition, when the server 1 cannot update software through communication with the software update device, the server 1 can provide an instruction for an update process by selectively transmitting update data to the portable terminal 3. Thus, software update performed through communication between the server 1 and the vehicle and software update performed via the portable terminal are not performed concurrently, and redundancy or inconsistency in software update can be suppressed.

In addition, the server 1 according to the present embodiment can perform software update using the communication function or the display screen of the portable terminal 3 when in-vehicle devices that are necessary for software update such as the communication module 12 and the display device 14 are not mounted.

Second Embodiment

A server according to a second embodiment will be described, mainly with regard to differences from the first embodiment.

Figures 14, 15:
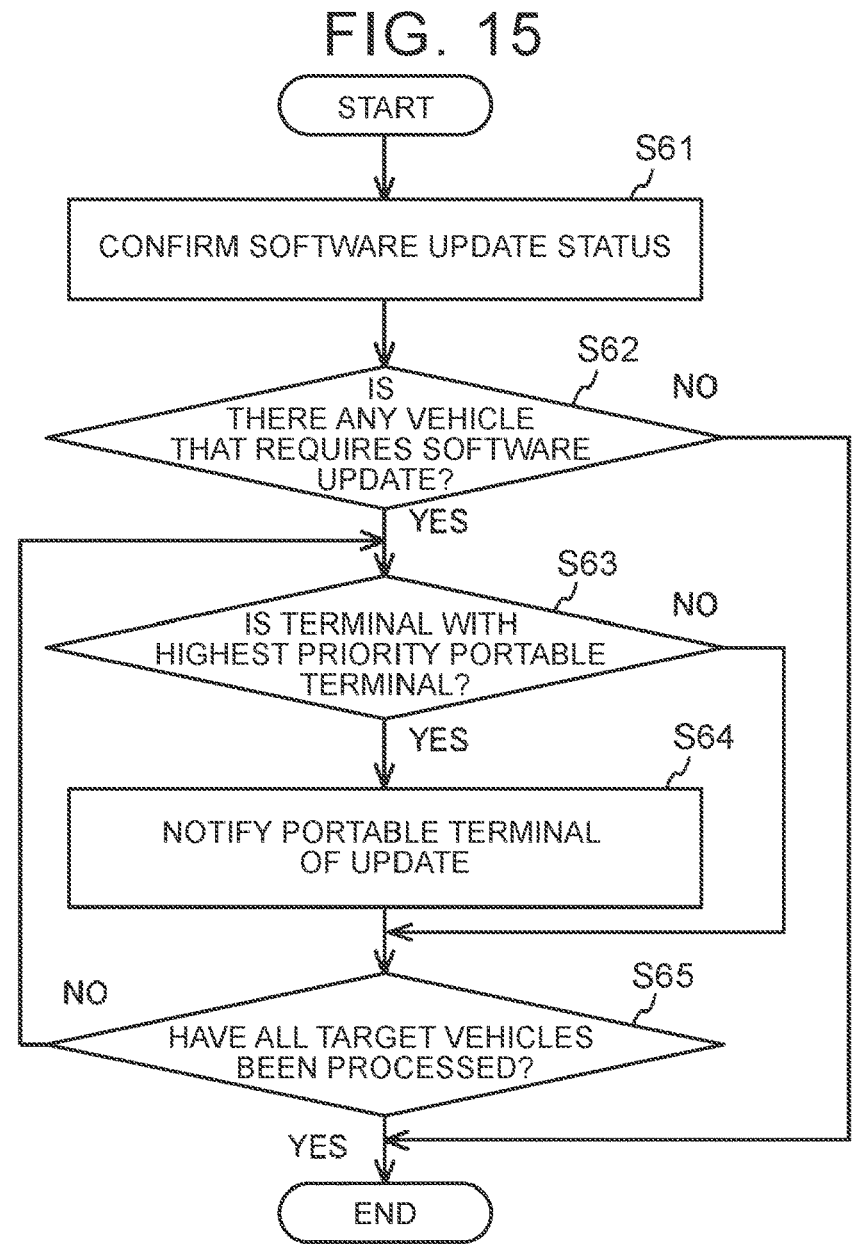
FIG. 14 illustrates an example of device identification information stored in a server according to a second embodiment.
FIG. 15 is a flowchart illustrating an example of a control process performed by the server according to the second embodiment.

FIG. 14 illustrates an example of device identification information stored in the server according to the second embodiment.

The device identification information illustrated in FIG. 14 is information in which information that specifies the communication module 12 that is mounted on the vehicle and information that specifies the portable terminal 3 that can communicate with the software update device 11 are associated with each other in the order of priority for each piece of vehicle identification information (vehicle ID) that identifies a vehicle. As in the first embodiment, the information that specifies the communication module 12 and the information that specifies the portable terminal 3 may be information that allows the server 1 to uniquely designate the destination for transmission of data, for example, and may be an address on a network such as an Internet Protocol (IP) address, for example. The device identification information according to the present embodiment is used by the server 1 to acquire the destination for transmission of update data for software for the electronic control units. In the example in FIG. 14, the respective addresses of the communication module 12 and the portable terminal 3 are registered in the descending order of priority for a vehicle specified by a vehicle ID "VID_1001", and the respective addresses of the portable terminal 3 and the communication module 12 are registered in the descending order of priority for a vehicle specified by a vehicle ID "VID_1002". In addition, the respective addresses of the communication module 12 and the portable terminal 3 are registered for vehicles specified by vehicle IDs "VID_1003" and "VID_1004", respectively. While information on two terminals is registered for each vehicle ID in the example in FIG. 14, three or more terminals may be registered in the order of priority.

FIG. 15 is a flowchart illustrating an example of a control process performed by the server according to the second embodiment.

In step S61, the control unit 28 confirms the status of update of software in each vehicle. Specifically, the control unit 28 references the update management information (FIG. 7) stored in the first storage unit 25, and extracts a record of a vehicle that requires update of software for the electronic control units based on a comparison between the version of software for the electronic control units recorded in the update management information and the latest version of the software. In the following description, the vehicles that require software update extracted in step S11 will be referred to as "target vehicles". After that, the process proceeds to step S62.

In step S62, the control unit 28 determines whether there is any vehicle that requires software update. The control unit 28 determines YES when any record of a vehicle that requires software update is extracted in step S61. The process proceeds to step S63 when the result of the determination in step S62 is YES, and is ended otherwise.

In step S63, the control unit 28 selects one of the records of the target vehicles extracted in step S61, references the device identification information, and determines whether the terminal with the highest priority correlated with the vehicle ID in the selected record is the portable terminal 3. The process proceeds to step S64 when the result of the determination in step S63 is YES, and proceeds to step S65 otherwise.

In step S64, the communication unit 27 transmits a notification indicating that it is necessary to update the software for the electronic control units to the portable terminal 3 referenced in step S63. After that, the process proceeds to step S65.

In step S65, the control unit 28 determines whether the records of all the target vehicles extracted in step S61 have been processed (whether the processes in steps S63 and S64 have been performed). The process is ended when the result of the determination in step S65 is YES, and proceeds to step S63 otherwise.

When the device identification information according to the present embodiment is used, a sub terminal (terminal with low priority) can be selected as the second destination for transmission of update data when communication with a main terminal (terminal with high priority) cannot be made.

Thus, software for the electronic control units can be updated at appropriate times using communication with the sub terminal even when the server 1 cannot communicate with the main terminal. In addition, the server 1 can provide an instruction to execute an update process by selectively transmitting update data to one of the main terminal and the sub terminal. Thus, software update performed through communication between the server 1 and the vehicle and software update performed via the portable terminal are not performed concurrently, and redundancy or inconsistency in software update can be suppressed.

In the present embodiment, in addition, the portable terminal 3 may be registered as the main terminal in the device identification information. Thus, it is possible to reliably indicate that there are update data for software for the electronic control units when in-vehicle devices that are necessary for software update such as the communication module 12 and the display device 14 are not mounted on the vehicle. When the portable terminal 3 is registered as the main terminal in the device identification information, in addition, software update can be managed using the portable terminal registered in advance. Thus, the present embodiment is suitable when a plurality of vehicles is managed for car rental, car sharing, etc.

Other Modifications

The function of the server 1 described in relation to each of the above embodiments can also be implemented as an update data distribution method executed by a computer including a processor (CPU), a memory, and a storage device, a distribution program executed by the computer, or a computer-readable non-transitory storage medium storing the distribution program. Similarly, the function of the software update device 11 described in relation to each of the embodiments can also be implemented as an update control method executed by an in-vehicle computer that includes a processor (CPU), a memory, and a storage device, an update control program executed by the in-vehicle computer, or a computer-readable non-transitory storage medium storing the update control program.

In each of the above embodiments, on the vehicle side, the software update device 11 that is provided in an in-vehicle network serves as a master device (an update control device) to control program update for all the electronic control units 13a to 13d. However, one of the electronic control units 13a to 13d may have an update control function and control program update for the other electronic control units, rather than providing the software update device 11. Alternatively, the update control function of the software update device 11 may be provided to an external device that is connectable to the in-vehicle network 2 through a wire so that a program update process for the electronic control units 13a to 13d can be performed using the external device, rather than providing the software update device 11.

The technique according to the present disclosure can be used for a network system for updating software for electronic control units.

What is claimed is:

1. A server configured to distribute update data to be installed in an electronic control unit mounted on a vehicle, the server comprising:

a storage device that stores information on the vehicle and priority information indicating respective priorities of a communication module and a smartphone, the communication module being mounted in the vehicle, and the smartphone being configured to communicate with the vehicle; and a processor configured to:

determine, based on the priority information, whether the communication module has a higher priority than the smartphone or whether the smartphone has the higher priority than the communication module;

transmit, based on receipt of a request from the vehicle, the update data to the communication module when determining that the communication module has the higher priority than the smartphone; and transmit, based on receipt of a request from the smartphone, the update data to the smartphone when determining that the smartphone has the higher priority than the communication module to allow the update data to be transferred from the smartphone to the vehicle, wherein:

the processor is configured to, when communication with the communication module is disrupted, transmit the update data to the smartphone even when the communication module is mounted on the vehicle such that the update data is provided to the vehicle via the smartphone even when the server cannot communicate with the vehicle in order to perform a software update at an appropriate time.

2. A non-transitory storage medium storing a distribution program in order to distribute update data for software for an electronic control unit mounted on a vehicle that is executable by a computer including a processor, the non-transitory storage medium stores priority information indicating respective priorities of a communication module and a smartphone, the communication module being mounted in the vehicle, and the smartphone being configured to communicate with the vehicle, the distribution program causing the processor to execute the following steps:

determining, based on the priority information, whether the communication module has a higher priority than the smartphone or whether the smartphone has the higher priority than the communication module;

transmitting, based on receipt of a request from the vehicle, the update data to the communication module when determining that the communication module has the higher priority than the smartphone; and transmitting, based on receipt of a request from the smartphone, the update data to the smartphone when determining that the smartphone has the higher priority than the communication module to allow the update data to be transferred from the smartphone to the vehicle, wherein:

when communication with the communication module is disrupted, transmitting the update data to the smartphone even when the communication module is mounted on the vehicle such that the update data is provided to the vehicle via the smartphone even when a server cannot communicate with the vehicle in order to perform a software update at an appropriate time.

* * * * *